United States Patent
Salter et al.

(10) Patent No.: US 11,951,878 B2
(45) Date of Patent: Apr. 9, 2024

(54) VEHICLE HAVING SEAT CONTROL BASED ON MONITORED PET LOCATION

(71) Applicant: Ford Global Technologies, LLC, Dearborn, MI (US)

(72) Inventors: Stuart C. Salter, White Lake, MI (US); Hussein H. Berry, Dearborn, MI (US); Annette Lynn Huebner, Highland, MI (US); Marguerite Lynn Kimball, Brighton, MI (US); David Brian Glickman, Southfield, MI (US); Gregory Paul Thomas, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 364 days.

(21) Appl. No.: 17/307,242

(22) Filed: May 4, 2021

(65) Prior Publication Data
US 2022/0355710 A1 Nov. 10, 2022

(51) Int. Cl.
| | |
|---|---|
| *B60N 2/02* | (2006.01) |
| *B60N 2/00* | (2006.01) |
| *B60N 2/20* | (2006.01) |
| *G06V 20/59* | (2022.01) |

(52) U.S. Cl.
CPC .......... *B60N 2/0244* (2013.01); *B60N 2/002* (2013.01); *B60N 2/20* (2013.01); *G06V 20/593* (2022.01); *B60N 2/0268* (2023.08)

(58) Field of Classification Search
CPC .. B60N 2/002; B60N 2/20; B60N 2002/0268; G06V 20/593
See application file for complete search history.

(56) References Cited

U.S. PATENT DOCUMENTS

| | | | |
|---|---|---|---|
| 5,724,920 | A | 3/1998 | Meisman et al. |
| 7,527,017 | B1 | 5/2009 | Cribb |
| 7,600,486 | B2 | 10/2009 | Ellis |
| 8,100,084 | B1 | 1/2012 | Abramson |
| 8,117,991 | B1 | 2/2012 | Civitillo |
| 8,146,534 | B1 | 4/2012 | Robertson |
| 8,258,932 | B2 | 9/2012 | Wahlstrom |
| 8,768,292 | B2 | 7/2014 | Welch |
| 9,227,484 | B1 | 1/2016 | Justice et al. |

(Continued)

FOREIGN PATENT DOCUMENTS

| | | |
|---|---|---|
| CN | 109839929 A | 6/2019 |
| JP | 2006219009 A | 8/2006 |

*Primary Examiner* — James M McPherson
*Assistant Examiner* — Clint Pham
(74) *Attorney, Agent, or Firm* — Vichit Chea; Price Heneveld LLP

(57) ABSTRACT

A vehicle is provided that includes a vehicle body defining a cabin interior, a plurality of seats located within the cabin interior, each seat having an adjustable seat base and an adjustable seat back, a monitoring system for detecting and monitoring a pet within the cabin interior, and a controller processing signals generated by the monitoring system and determining a location of the pet based on the monitored signals, the controller further controlling at least one of the adjustable seat base and adjustable seat back of a seat based on the determined location of the pet so that the seat is configured to accommodate the pet.

20 Claims, 5 Drawing Sheets

(56) References Cited

U.S. PATENT DOCUMENTS

| | | |
|---|---|---|
| 9,392,770 B2 | 7/2016 | Almeida |
| 9,463,805 B2 | 10/2016 | Kirsch et al. |
| 9,637,085 B2 | 5/2017 | Sanchez Huipio et al. |
| 9,654,103 B2 | 5/2017 | Buttolo et al. |
| 9,845,050 B1 * | 12/2017 | Garza ................ G08B 21/0205 |
| 9,975,481 B2 | 5/2018 | Hatton et al. |
| 10,091,972 B1 | 10/2018 | Jensen et al. |
| 10,115,029 B1 | 10/2018 | Day et al. |
| 10,303,961 B1 | 5/2019 | Stoffel et al. |
| 10,352,759 B1 | 7/2019 | Jensen |
| 10,649,061 B2 | 5/2020 | Bjorkengren |
| 10,742,969 B1 | 8/2020 | Rohatgi et al. |
| 10,785,604 B1 | 9/2020 | Kumar et al. |
| 11,067,452 B1 | 7/2021 | Lee et al. |
| 11,562,550 B1 | 1/2023 | Asghar et al. |
| 2002/0169583 A1 | 11/2002 | Gutta et al. |
| 2007/0131177 A1 | 6/2007 | Perkitny |
| 2008/0246318 A1 | 10/2008 | Bothe et al. |
| 2010/0305816 A1 | 12/2010 | Orlewski |
| 2014/0309806 A1 | 10/2014 | Ricci |
| 2014/0309862 A1 | 10/2014 | Ricci |
| 2014/0310739 A1 | 10/2014 | Ricci et al. |
| 2014/0319895 A1 | 10/2014 | Lange-Mao et al. |
| 2015/0342143 A1 | 12/2015 | Stewart |
| 2016/0070527 A1 | 3/2016 | Ricci |
| 2016/0227732 A1 | 8/2016 | Pompey |
| 2016/0272112 A1 | 9/2016 | DeGrazia et al. |
| 2016/0357262 A1 | 12/2016 | Ansari |
| 2018/0194194 A1 | 7/2018 | Lyubich et al. |
| 2019/0016235 A1 * | 1/2019 | Parida ................ B60N 2/0248 |
| 2019/0118603 A1 | 4/2019 | Feit |
| 2019/0279447 A1 | 9/2019 | Ricci |
| 2019/0389352 A1 | 12/2019 | Koller et al. |
| 2020/0085004 A1 | 3/2020 | Yoo et al. |
| 2020/0130702 A1 * | 4/2020 | Ferreira ................ B60W 10/30 |
| 2020/0307483 A1 * | 10/2020 | Topf .................. G01G 19/4142 |
| 2020/0383580 A1 * | 12/2020 | Shouldice ............ B60W 50/14 |
| 2021/0232642 A1 | 7/2021 | Ricci |
| 2022/0112760 A1 | 4/2022 | Demele et al. |
| 2023/0106673 A1 | 4/2023 | Asghar et al. |
| 2023/0230121 A1 | 7/2023 | Chintakindi et al. |

* cited by examiner

VEHICLE HAVING SEAT CONTROL BASED ON MONITORED PET LOCATION

FIELD OF THE DISCLOSURE

The present disclosure generally relates to transport vehicles, and more particularly relates to a vehicle that monitors location of a pet in the vehicle and controls one or more seat settings.

BACKGROUND OF THE DISCLOSURE

Automotive vehicles are commonly used to transport pets such as dogs, cats and other animals. When traveling in a vehicle, pets may often travel without cages or other restraint devices, such that the pet generally may move about the passenger compartment of the cabin interior. In doing so, pets may sit or lay down on the passenger seats. It may be desirable to provide for enhanced seating positions to accommodate the pet in the vehicle.

SUMMARY OF THE DISCLOSURE

According to a first aspect of the present disclosure, a vehicle is provided. The vehicle includes a vehicle body defining a cabin interior, a plurality of seats located within the cabin interior, each seat having an adjustable seat base and an adjustable seat back, a monitoring system for detecting and monitoring a pet within the cabin interior, and a controller processing signals generated by the monitoring system and determining a location of the pet relative to a seat based on the processed signals, the controller further controlling at least one of the adjustable seat base and the adjustable seat back of the seat based on the determined location of the pet being on the seat so that the seat is configured to accommodate the pet.

Embodiments of the first aspect of the disclosure can include any one or a combination of the following features:
  the controller adjusts the adjustable seat base to raise a front of the seat base relative to a rear of the seat base by a seat base angle in the range of 5 to 30 degrees;
  the seat base angle is in the range of 10 to 20 degrees;
  the controller controls the seat adjustable seat back to recline the adjustable seat back to a seat back angle in the range of 5 to 30 degrees;
  each seat has an extendable thigh bolster, wherein the controller extends the thigh bolster when a pet is detected located on the seat;
  the plurality of seats includes a front passenger seat;
  the monitoring system comprises one or more imaging devices for capturing image signals of the pet within the vehicle, wherein the controller processes the captured image signals to determine the presence of the pet and the location of the pet within the vehicle;
  the monitoring system comprises a plurality of first RF signal communication devices located at a plurality of locations on the vehicle, and a second RF signal communication device configured to be located on a pet for communicating RF signals with the plurality of first RF signal communication devices, wherein the controller processes the RF signals and determines the location of the pet based on the processed RF signals; and
  the second RF signal communication device is located on a wearable device of the pet.

According to a second aspect of the present disclosure, a vehicle is provided. The vehicle includes a vehicle body defining a cabin interior, a plurality of seats located within the cabin interior, each seat having an adjustable seat base and an adjustable seat back, a monitoring system for detecting and monitoring a pet within the cabin interior, and a controller processing signals generated by the monitoring system and determining a location of the pet relative to a seat based on the processed signals, the controller further controlling at least one of the adjustable seat base and the adjustable seat back of a seat based on the determined location of the pet being positioned on the seat so that the seat is configured to accommodate the pet to change an angle of the at least one of the adjustable seat base and adjustable seat back in the range of 5 to 30 degrees.

Embodiments of the second aspect of the disclosure can include any one or a combination of the following features:
  the controller adjusts the adjustable seat base to raise a front of the seat base relative to a rear of the seat base by a seat base angle in the range of 5 to 30 degrees;
  the seat base angle is in the range of 10 to 20 degrees;
  the controller controls the seat adjustable seat back to recline the adjustable seat back to an angle in the range of 5 to 30 degrees;
  each seat has an extendable thigh bolster, wherein the controller extends the thigh bolster when a pet is detected located on the seat;
  the plurality of seats includes a front passenger seat;
  the monitoring system comprises one or more imaging devices for capturing image signals of the pet within the vehicle, wherein the controller processes the captured image signals to determine the presence of the pet and the location of the pet within the vehicle; and
  monitoring system comprises a plurality of first RF signal communication devices located at a plurality of locations on the vehicle, and a second RF signal communication device configured to be located on a pet for communicating RF signals with the plurality of first RF signal communication devices, wherein the controller processes the RF signals and determines the location of the pet based on the processed RF signals.

According to a third aspect of the present disclosure, a method of controlling a seat in a vehicle is provided. The method comprising the steps of detecting a pet within the vehicle with a monitoring system, determining a location of the pet within the vehicle relative to a seat, and controlling with a controller at least one of an adjustable seat base and an adjustable seat back of the seat when the pet is determined to be located on the seat, wherein the adjustable seat base is raised on a front relative to a rear to a seat base angle in the range of 5 to 30 degrees.

Embodiments of the third aspect of the disclosure can include any one or a combination of the following features:
  the step of reclining the adjustable seat back to a seat back angle in the range of 5 to 30 degrees; and
  the step of extending a seat bolster on the seat.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
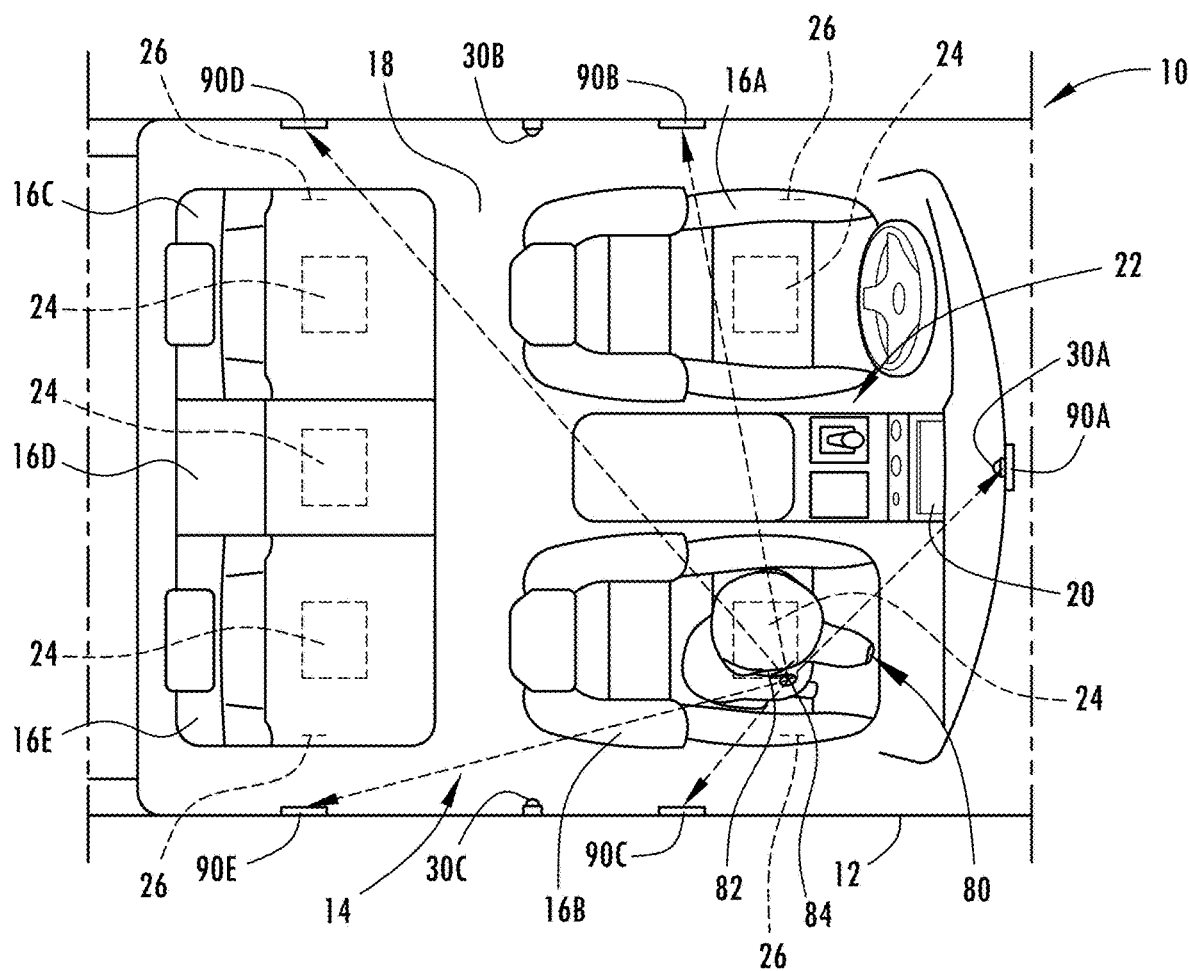
FIG. 1 is a top view of a cabin interior of a vehicle transporting a pet seated on a passenger seat within the cabin interior and RF signal communication devices and imaging devices for monitoring the pet.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to pet detection and control of seating in a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, the cabin interior 14 of a wheeled automotive or motor vehicle 10 is generally illustrated configured with passenger seating and accommodations for transporting living beings such as people and pets. The cabin interior 14 is generally defined by a vehicle body 12 and may contain various features and trim components within the vehicle body 12. The cabin interior 14 is shown having an arrangement of passenger seats including a first or front row of driver and passenger seats 16A and 16B and a second or rear row of three seats 16C-16E shown as bench or split bench seating. The vehicle 10 may also possess additional rows of seating as in the case of a typical large SUV, van or bus. The vehicle body 12 further defines a floor 18 upon which the seating is assembled. It should be appreciated that the vehicle 10 may be a motor vehicle, such as a wheeled car, truck, SUV, van or bus, for example, or an airplane, train, boat or other vehicle capable of transporting people and pets.

The vehicle 10 is further shown containing a pet 80, such as a dog, sitting on one of the rear seats 16B for travel as a passenger within the cabin interior 14 of the vehicle 10. It should be appreciated that the vehicle 10 may transport any of a number of living beings, including one or more persons and one or more pets such as dogs and cats, for example. The pet 80 is shown wearing a wearable device in the form of a collar 82 which is equipped with a radio frequency (RF) signal communication device such as an RF signal transmitter 84. It should be appreciated that the pet 80 may be positioned at any of a number of locations within the cabin interior 14 of the vehicle 10 and may move about the cabin interior 14 if unrestrained. Depending on the location of the pet 80 within the cabin interior 14 one or more adjustable positions of the seats may be controlled as disclosed herein.

The vehicle 10 is equipped with a center console 22 shown located between the front row driver seat 16A and passenger seat 16B. As such, the center console 22 separates the driver seat from the passenger seat. It should be appreciated that the pet 80 may be located on the passenger seat 16B or any of the rear seats 16C-16E while the vehicle 10 is operating. However, the driver seat 16A is provided to accommodate seating of the driver of the vehicle as opposed to a pet. For a fully autonomous vehicle, when a driver is not present it is possible that a pet 80 may be located on the driver seat 16A.

Figure 2:
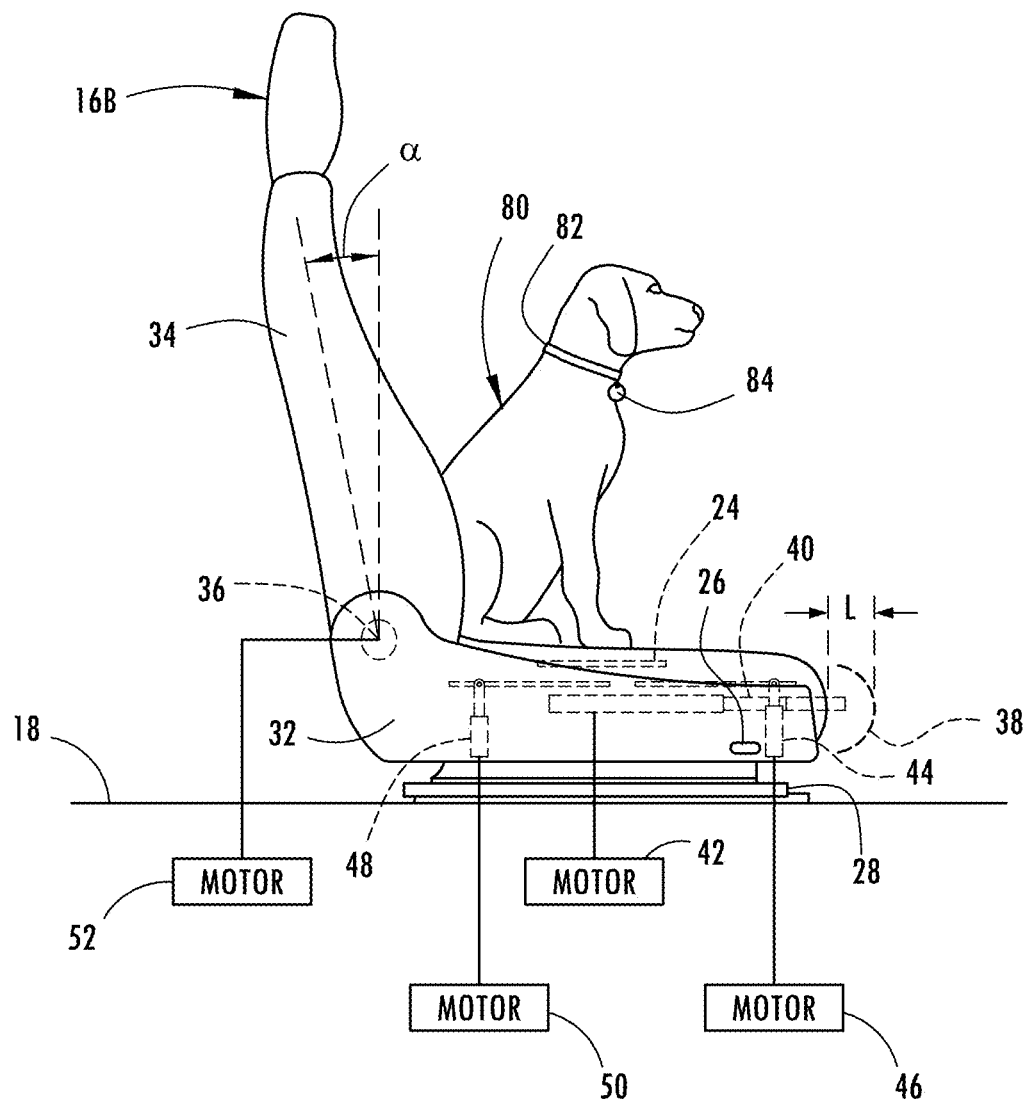
FIG. 2 is a side view of the passenger seat with the pet located thereon and the seat in a first seating position, according to one example.
Figure 3:
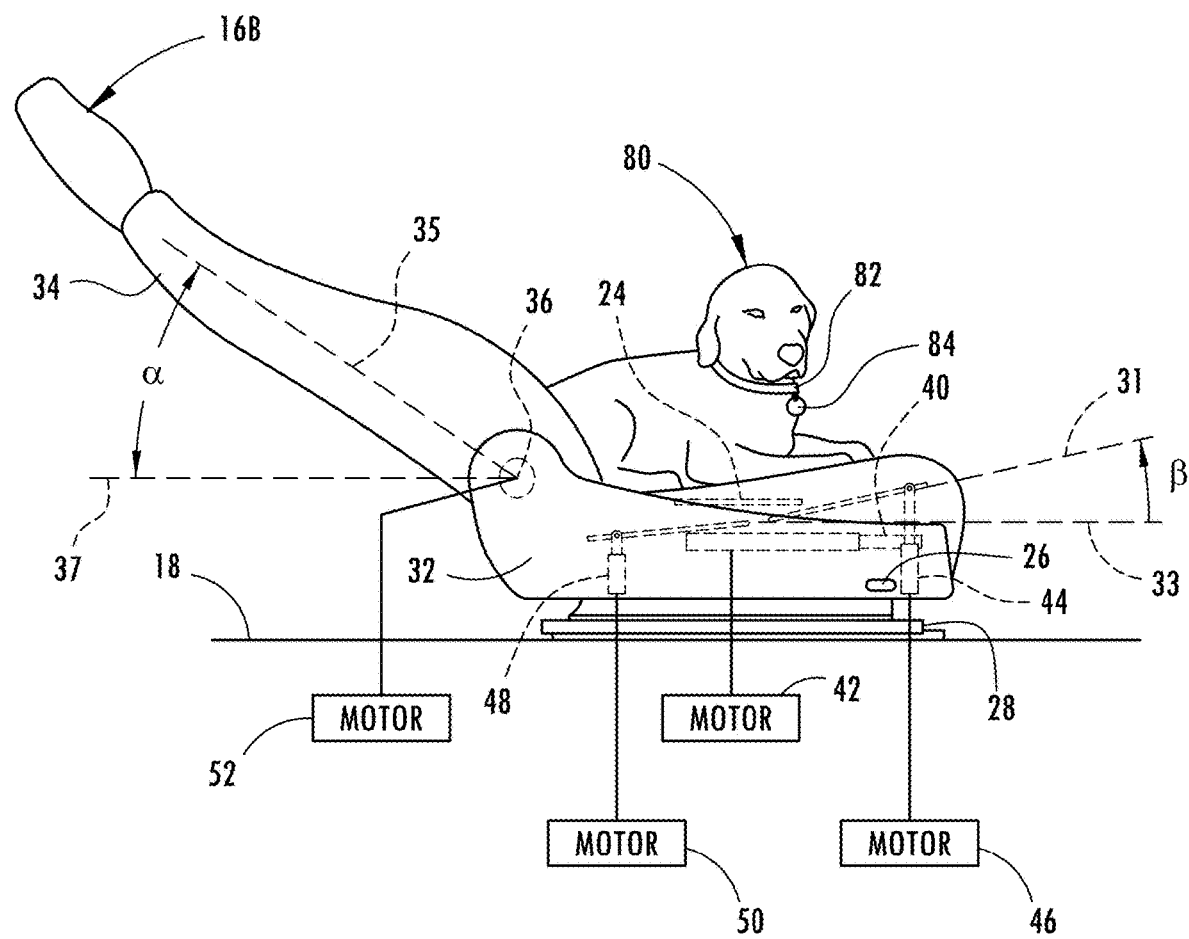
FIG. 3 is a side view of the passenger seat with the pet located thereon and the seat in a second seating position.

Each of the seats 16A-16E may include an adjustable seat base 32 pivotally connected to a seat back 34 at pivot shaft 36 as shown in FIGS. 2 and 3. The seat base 32 may be mounted on a seat mount assembly 28 that may be adjustable in position via a front linear drive 44 and a rear linear drive 48 relative to the seat mount assembly 28. The front linear drive 44 may be actuated with an electric motor 46 to move the front side of the seat up or down relative to the seat mount assembly 28. Similarly, the rear linear drive 48 may be actuated by an electric motor 50 to move the rear side of the seat base 32 up and down relative to the seat mount assembly 28. The seat base angle β is measured as the angle between a horizontal line 33 extending through an effective pivot point on the seat and a line 31 extending along the upper seating surface of the seat base 32. While a pair of linear drives 44 and 48 are shown for actuating the seat base 32 up and down and rotating the seat base 32 to an inclined seat base angle β relative to the horizontal line 33, it should be appreciated that the seat base 32 may be actuated to rotate to an inclined seat base angle with one or more actuators that otherwise rotate the seat base 32 relative to the seat mount assembly 28.

The seat base 32 also includes a thigh bolster 38 that may be extended outward to extend the length of the seat base 32. The thigh bolster 38 may include a linear actuator 40 for extending the thigh bolster 38 outward to an extended position and for retracting the thigh bolster 38 to a retracted position. The linear actuator 40 may be actuated with an electric motor 42. The thigh bolster 38 may extend the effective length of the seat by a distance length L such as up to 12 cm, according to one example.

The seat back 34 is rotatable relative to the seat base 34 about a pivot shaft 36 with the use of an electric motor 52 to change the inclined seat back angle α of the seat back 34. As such, the inclined seat back angle of the seat back 34 may be adjusted with the actuator, e.g., motor 52.

The seat 16B is shown in a first seating position in FIG. 2 with a pet 80 seated thereon, prior to controllably adjusting the adjustable positions of the seat 16B once the pet location on the seat is detected. When the pet 80 is detected located on the seat 16B, a controller controls the actuators, such as motors 42, 46, 50 and 52 to adjust the position of one or more of the seat base 32, seat back 34 and thigh bolster 38 of the seat 16B to a second seating position to accommodate the pet 80 that is determined to be seated thereon. As such, the controller controls at least one of the adjustable seat base 32, the adjustable seat back 34 and the thigh bolster 38 of the seat 16B based on the determined location of the pet 80 positioned on the seat so that the seat 16B is configured to accommodate the pet 80. The controller may adjust the adjustable seat base 32 to raise a front of the seat base and/or lower a rear of the seat base to thereby rotate the seat base 32 to increase the inclined seat base angle β. The seat base angle β may be in the range of 5 to 30 degrees, according to one example. More specifically, the seat base angle β may be in the range of 10 to 20 degrees. As such, by increasing the seat base angle β of the seat base 32, the pet 80 may be better secured on the seat base 32 at an angle that prevents the pet 80 from easily sliding off the seat 16B during normal deceleration of the vehicle 10.

In addition, the seat back 34 may be rotated by an inclined seat back angle α relative to a horizontal line 37 extending through the pivot shaft 36. The sat back angle α is measured between the horizontal line 37 and a line 35 extending along the front seating surface of the seat back 34. The seat back angle α may be in the range of 5 to 30 degrees, according to one example. More specifically, the seat back angle α may be in the range of 10 to 20 degrees. By rotating the seat back 34 to a reclined position at seat back angle α, more space is available on the seat for a pet 80, particularly for a larger pet.

For a larger pet, the thigh bolster 38 may be extended outward by a length L to further accommodate the pet 80. By providing an increased length of the seat base 32 with the thigh bolster 38, a larger pet has a larger surface upon which to sit or lay upon. The seat 16B may include a weight sensor 24 that may measure the weight of an object, such as a pet 80 seated on the seat. If the measured weight of the pet is larger enough to indicate a large pet, e.g., greater than 50 pounds, the seat 16B may be adjusted to better accommodate a larger pet. For a smaller pet, the seat settings may be adjusted differently.

In order to determine the location of the pet 80 within the cabin interior 14, the vehicle 10 may monitor for the presence and determine the location of the pet 80 using one or more imaging devices, such as cameras and/or monitoring radio frequency (RF) signals associated with RF signal communication device(s) such as an RF signal transmitter located on the pet. The vehicle 10 is equipped with one or more imaging devices, which may include three imaging devices 30A-30C located at various locations within the cabin interior 14 to capture images of the cabin interior 14. The imaging devices 30A-30C may include cameras that capture images of the cabin interior 14. It should be appreciated that cabin interior 14 may be equipped with one or more imaging devices. The imaging devices 30A-30C may compare known images of pets with image signals captured by one or more of the imaging devices 30A-30C within the cabin interior 14 and determine the presence of one or more pets 80 within the cabin interior 14. This may be accomplished by using image processing looking for features in the captured images associated with a pet, such as a dog. By monitoring the image signals captured with the imaging devices 30A-30C, the presence and movement of a pet 80 within the cabin interior 14 may be detected. For example, a pet 80 may be detected on a rear seat, such as seat 16C, and its movement to a position on top of or proximate to the front passenger seat 16B, as shown in FIG. 1, may be detected. In the position shown in FIG. 1, the presence of a pet 80 located on the seat 16B may be used to control the position settings of the seat 16B to accommodate the pet 80 based on the detected location of the pet 80 positioned on a particular seat.

As seen in FIG. 1, the vehicle 10 is configured to include a plurality of first RF signal communication devices shown and described herein as a plurality of RF receivers 90A-90E positioned at different locations on board the vehicle 10. In the example shown, the vehicle 10 is equipped with five (5) RF receivers 90A-90E, however, it should be appreciated that any number of RF receivers may be employed. The RF receivers 90A-90E each may receive RF signals transmitted by one or more RF transmitters including the RF transmitter 84 located on the collar 82 of the pet 80. The RF receivers 90A-90E may be configured as RF transceivers which may allow for the transmission and reception of RF signals. As such, RF transceivers may receive the RF transmit signals from the RF transmitter 84 and may further transmit signals to other communication devices on-board or off-board the vehicle 10.

The RF transmitter 84 may be configured as an RF transceiver that both transmits and receives RF signals. The RF transmitter 84 may use Bluetooth® low energy (BLE) commonly operating in 2.4 GHz ISM band (Industrial Scientific and Medical) and used for wireless personal area networks, according to one example. According to another example, the RF transmitter 84 may use an Ultra Wide-Band (UWB) protocol which may operate in the 6-8 GHz band. With both BLE or UWB, the system may employ the use of Round-Trip Time (RTT) Time of Flight (ToF) to establish the pet collar location through triangulation or other methods such as Angle-of-Arrival (AoA), Received Signal Strength Indication (RSSI), Phase or other methods. Further, other technologies may be used such as low frequency (i.e., 125-134 kHz) RSSI or acoustic or ultrasonic sound.

As seen in FIGS. 1-3, a second RF signal communication device embodied as an RF transmitter 84 is located on the collar 82 worn on the pet 80 and transmits a low energy RF signal that may be received by each of the five RF receivers 90A-90E. RF receiver 90A is shown located at a position generally at the forward end of the cabin interior 14, RF receivers 90B and 90C are shown located on opposite left and right lateral sides of the front row of seating, and RF receivers 90D and 90E are shown located on opposite left and right lateral sides of the second row of seating. As such, each of the RF receivers 90A-90E is located in a different location separated from the other RF receivers 90A-90E. The RF signal transmitted from the RF transmitter 84 is received by each of the RF receivers 90A-90E and is processed to determine a location of the pet 80. According to one embodiment, this may be achieved by processing the received signal strength or amplitude of the RF signal received at each of the RF receivers 90A-90E and determining via triangulation a geographic location of the pet 80. By determining the amplitude of the RF signal received by each RF receivers 90A-90E, the distance from each RF receiver to the RF transmitter can be determined. Given the relative location to each RF receiver, the location of the RF transmitter transmitting the processed signal can be determined using triangulation.

Figure 4:
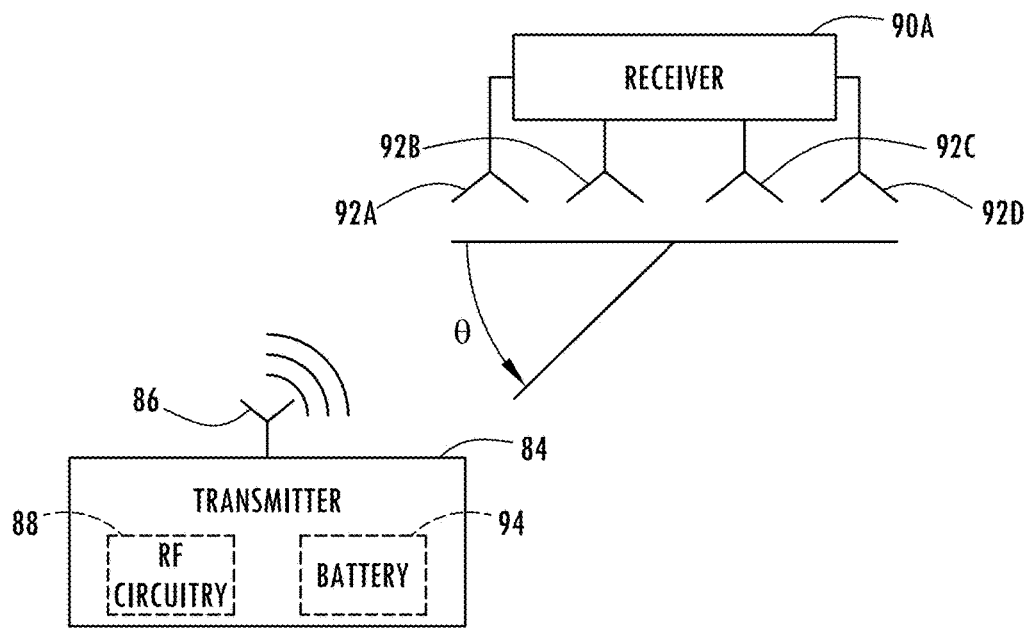
FIG. 4 is a schematic view of an RF signal transmitter communicating with an RF signal receiver to track location of the RF signal transmitter, according to one example.
Figure 5:
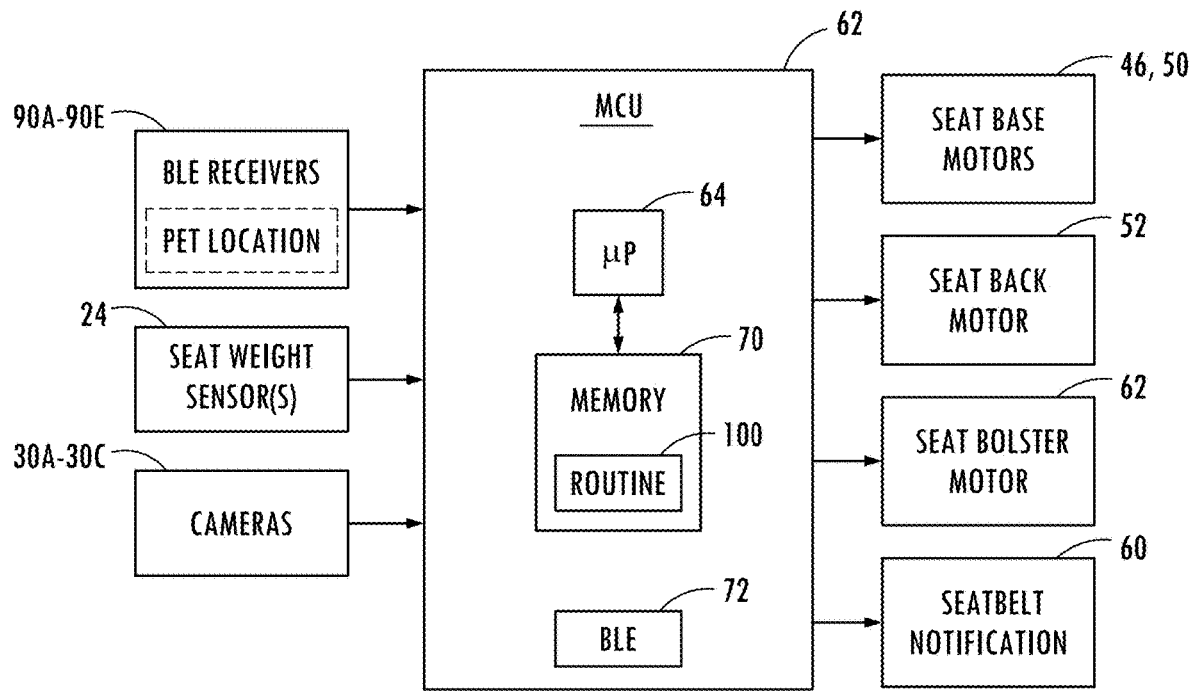
FIG. 5 is a block diagram illustrating a controller configured for controlling the seat position based on the monitored pet.

According to another embodiment, the RF receivers 90A-90E may include a plurality of antennas that further enable determination of an approximate angle θ of arrival as shown in FIG. 4 to provide enhanced accuracy determination to the location of the RF transmitter 84 associated with the pet 80. In this embodiment, RF receiver 90A is shown having a plurality of antennas, shown as four antennas 92A-92D for receiving an RF signal transmit from the RF transmitter 84 with antenna 86 and determining an angle θ of arrival of the signal based on the arrangement of the plurality of antennas 92A-92D. The amplitude of the signal received at each of the RF receivers 90A-90E may further be processed to determine distance to each RF receivers and to determine an accurate position of the RF transmitter by using triangulation. RF receivers 90A-90E may likewise be configured as shown in FIG. 5. According to a further embodiment, the location of the RF transmitter may be determined based on a determined round trip time of flight.

As such, the pet 80 may be monitored and the location of the RF transmitter 84 on the pet 80 determined by processing the RF signals received with the RF receivers 90A-90E with a controller. The driver and passengers in the vehicle 10 may be notified of the location of the pet 80 on a human machine interface (HMI), such as a vehicle display screen 20. The determined location of the pet 80 may be used to control various functions on board the vehicle 10 such as adjusting the position settings of the seat 16B that the pet 80 is seated on.

The RF transmitter 84 may include an antenna 86, RF circuitry 88, and an electrical power source in the form of a battery 94. The vehicle 10 may provide an output signal to indicate when the pet collar battery 94 is running low so that the battery 94 may be replaced. Alternatively, the first RF signal communication devices may be configured as transceivers that may be used as power sources from which a battery-less transceiver on the pet collar 82 can harvest energy and then act as a transponder thus ensuring the pet monitoring system may operate without a battery. This may be achieved by harvesting energy from the RF signal received by the antenna with a blocking diode that charges one or more capacitors. While the RF transmitter 84 is shown located on the pet collar 82, it should be appreciated that the RF transmitter 84 may be located elsewhere on the pet 80 or an accessory associated with the pet 80 to provide signals used to identify the location of the pet 80.

The RF transmitter 84 may be configured to only transmit when located in a vehicle or to transmit at a higher transmission rate when in a vehicle, so as to consume less battery power. The RF transmitter 84 can remain in a dormant state and can be prompted to an active state by the vehicle system or may transmit signals only on request so as to further conserve the battery power. For example, with the RF transmitter 84 configured as an RF transceiver, the RF transceiver may receive a signal prompting the RF transmitter portion of the transceiver to transmit signals upon request and may otherwise remain in the dormant state to thereby conserve battery power.

While the second RF signal communication device in the form of the RF transmitter 84 is shown located on a pet collar 82 and the first RF signal communication devices in the form of the RF receivers 90A-90E are located on the vehicle 10, it should be appreciated that the RF transmitter 84 may be configured as an RF transceiver that may be located on either the pet collar 82 or the vehicle 10 and the plurality of RF receivers 90A-90E may be located on the other of the pet collar 82 and the vehicle 10, according to further embodiments.

Referring to FIG. 5, a controller 62 is shown for receiving various inputs and controlling various outputs depending upon the sensed location of the pet 80. The controller 62 is shown configured as a microcontrol unit (MCU) having a microprocessor 64 and memory 70. It should be appreciated that any analog and/or digital control circuitry may be employed as the controller 62. Stored within memory 70 and executed by microprocessor 64 are one or more control routines 100. Additionally, the controller 62 is shown having a wireless communication device 72, such as a Bluetooth® low energy device (BLE). The controller 62 receives various inputs made available on the vehicle 10 including received RF signals from the BLE receivers 90A-90E which may be processed to determine the location of the pet by communicating via the RF transmitter 84 using signal triangulation. Further the controller 62 receives video image signals captured from the imaging devices 30A-30C, such as cameras, located within the cabin interior. The controller 62 may process the captured image signals to detect the presence and determine the location and movement of one or more pets within the cabin interior. It should be appreciated that the controller 62 may determine the presence and location of the pet relative to a seat using one or both of the RF signals received with the RF receivers 90A-90E and the processed image signals received with one or more of the imaging devices 30A-30C.

The controller 62 determines a presence and location of a pet 80 within the vehicle cabin interior. If the pet 80 is determined to be located on one of the seats, the controller 62 controls the one or more of the actuators to adjust the position settings of the seat holding the pet. The actuators may adjust one or more of the inclined seat base angle of the seat base, the reclined seat back angle of the seat back, and the extended length position of the seat bolster to accommodate the pet 80 seated on that seat.

Figure 6:
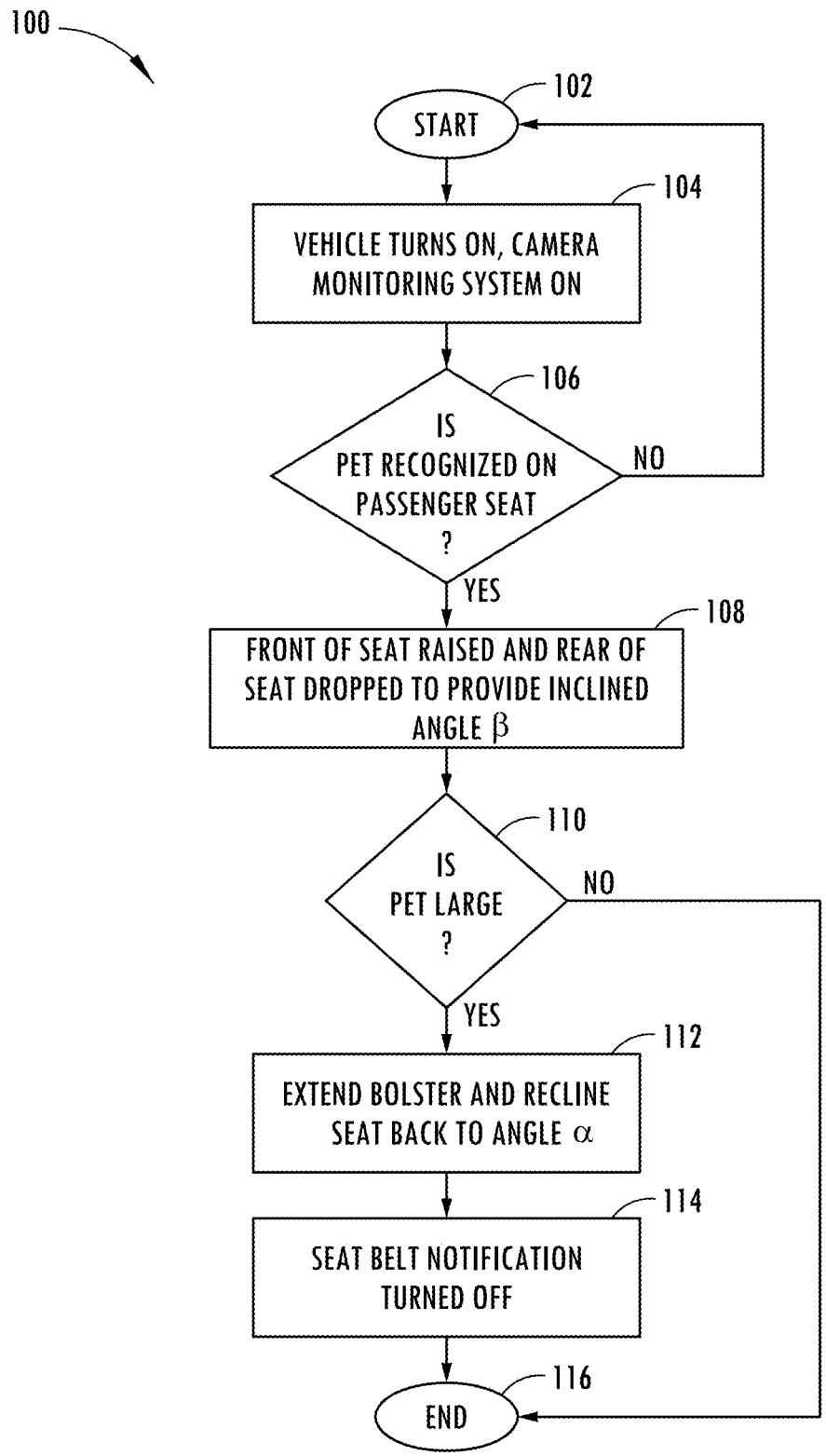
FIG. 6 is a flow diagram illustrating a control routine for controlling the seat position based on the monitored pet.

The routine 100, which is executed by the controller 62, is shown in FIG. 6, according to one example. Routine 100 begins with step 102 and proceeds to decision step 104 to turn on the vehicle and the camera monitoring system. Next, routine 100 proceeds to decision step 106 to determine if a pet is recognized positioned on a seat and, if not, returns to step 102. If a pet is recognized by the monitoring system positioned on a seat, routine 100 proceeds to step 108 to adjust the seat position settings of the seat which may include raising the front of the seat base and lowering the rear of the seat base. Next, routine 100 determines if the pet is a small or large pet. If the pet is a large pet e.g., greater than 50 pounds, the thigh bolster may be extended in length and the seat back may be further reclined to a lower seat back angle to accommodate a larger pet. Otherwise, routine 100 proceeds to step 112 to turn off the seat belt notification and routine 100 then ends at step 114.

Accordingly, the vehicle 10 advantageously provides for monitoring of the location of the pet 80 within a vehicle and controls the vehicle seating position settings based on the determined pet location on a seat. As a result, the seat may be reconfigured to better accommodate the pet.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
a vehicle body defining a cabin interior;
a plurality of seats located within the cabin interior, each seat having an adjustable seat base and an adjustable seat back;
an occupant monitoring system having a processor for detecting and monitoring a pet within the cabin interior and detecting a weight of the pet; and
a controller processing signals generated by the occupant monitoring system and determining a location of the pet on a seat within the cabin interior based on the processed signals, the controller further controlling at least one of the adjustable seat base and the adjustable seat back of the seat based on the determined location of the pet on the seat and the weight of the pet so that the seat is configured to accommodate the pet.

2. The vehicle of claim 1, wherein the controller adjusts the adjustable seat base to raise a front of the seat base relative to a rear of the seat base by a seat base angle in the range of 5 to 30 degrees.

3. The vehicle of claim 2, wherein the seat base angle is in the range of 10 to 20 degrees.

4. The vehicle of claim 1, wherein the controller controls the seat adjustable seat back to recline the adjustable seat back to a seat back angle in the range of 5 to 30 degrees.

5. The vehicle of claim 1, wherein each seat has an extendable thigh bolster, wherein the controller extends the thigh bolster when a pet is detected located on the seat.

6. The vehicle of claim 1, wherein the plurality of seats includes a front passenger seat.

7. The vehicle of claim 1, wherein the occupant monitoring system comprises one or more imaging devices for capturing image signals of the pet within the vehicle, wherein the controller processes the captured image signals to determine the presence of the pet and the location of the pet within the vehicle.

8. The vehicle of claim 1, wherein the occupant monitoring system comprises:
a plurality of first RF signal communication devices located at a plurality of locations on the vehicle; and
a second RF signal communication device configured to be located on a pet for communicating RF signals with the plurality of first RF signal communication devices, wherein the controller processes the RF signals and determines the location of the pet based on the processed RF signals.

9. The vehicle of claim 8, wherein the second RF signal communication device is located on a wearable device of the pet.

10. A vehicle comprising:
a vehicle body defining a cabin interior;
a plurality of seats located within the cabin interior, each seat having an adjustable seat base and an adjustable seat back;
an occupant monitoring system having a processor for detecting and monitoring a pet within the cabin interior and detecting a weight of the pet; and
a controller processing signals generated by the occupant monitoring system and determining a location of the pet on a seat within the cabin interior relative to a seat based on the processed signals, the controller further controlling at least one of the adjustable seat base and the adjustable seat back of a seat based on the determined location of the pet on the seat and the weight of the pet so that the seat is configured to accommodate the pet to change an angle of the at least one of the adjustable seat base and adjustable seat back in the range of 5 to 30 degrees.

11. The vehicle of claim 10, wherein the controller adjusts the adjustable seat base to raise a front of the seat base relative to a rear of the seat base by a seat base angle in the range of 5 to 30 degrees.

12. The vehicle of claim 11, wherein the seat base angle is in the range of 10 to 20 degrees.

13. The vehicle of claim 10, wherein the controller controls the seat adjustable seat back to recline the adjustable seat back to an angle in the range of 5 to 30 degrees.

14. The vehicle of claim 10, wherein each seat has an extendable thigh bolster, wherein the controller extends the thigh bolster when a pet is detected located on the seat.

15. The vehicle of claim 10, wherein the plurality of seats includes a front passenger seat.

16. The vehicle of claim 10, wherein the occupant monitoring system comprises one or more imaging devices for capturing image signals of the pet within the vehicle, wherein the controller processes the captured image signals to determine the presence of the pet and the location of the pet within the vehicle.

17. The vehicle of claim 10, wherein the occupant monitoring system comprises:
 a plurality of first RF signal communication devices located at a plurality of locations on the vehicle; and
 a second RF signal communication device configured to be located on a pet for communicating RF signals with the plurality of first RF signal communication devices, wherein the controller processes the RF signals and determines the location of the pet based on the processed RF signals.

18. A method of controlling a seat in a vehicle, the method comprising the steps of:
 detecting a pet within a cabin interior of the vehicle with an occupant monitoring system having a processor;
 detecting a weight of the pet;
 determining a location of the pet on a seat within the cabin interior of the vehicle; and
 controlling with a controller at least one of an adjustable seat base and an adjustable seat back of the seat based on the weight of the pet when the pet is determined to be located on the seat, wherein the adjustable seat base is raised on a front relative to a rear to a seat base angle in the range of 5 to 30 degrees.

19. The method of claim 18, further comprising the step of reclining the adjustable seat back to a seat back angle in the range of 5 to 30 degrees.

20. The method of claim 18, further comprising the step of extending a seat bolster on the seat.

* * * * *